L. L. KNOX.
WATER COOLED VALVE OR DAMPER.
APPLICATION FILED APR. 19, 1913.
1,102,197.
Patented June 30, 1914.
2 SHEETS—SHEET 1.
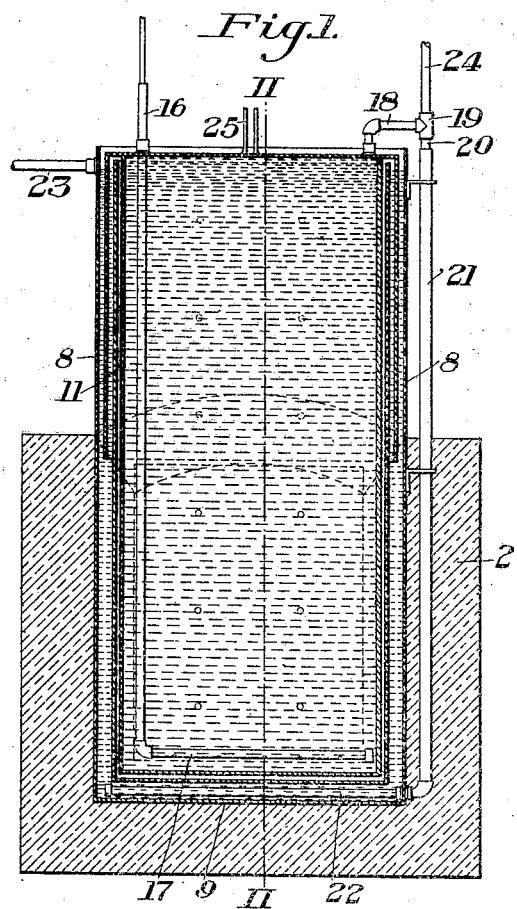
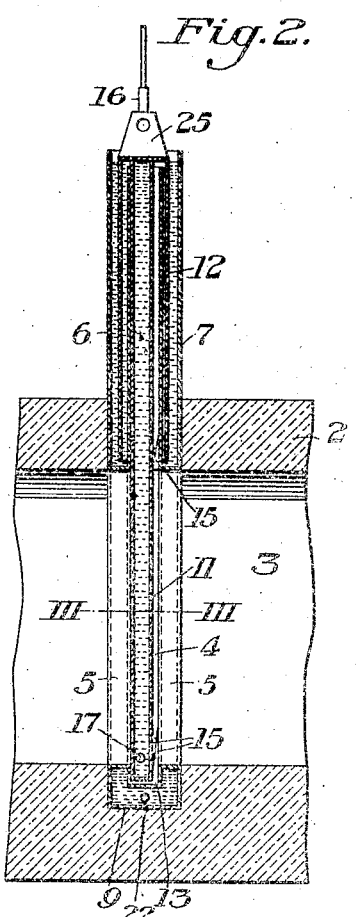
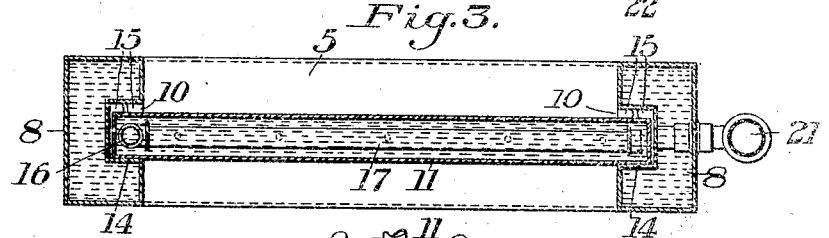
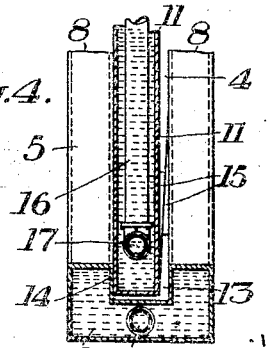
WITNESSES
R. A. Balderson
Jesse B. Heller
INVENTOR
L. L. Knox
by Bakewell, Byrnes, Parmelee

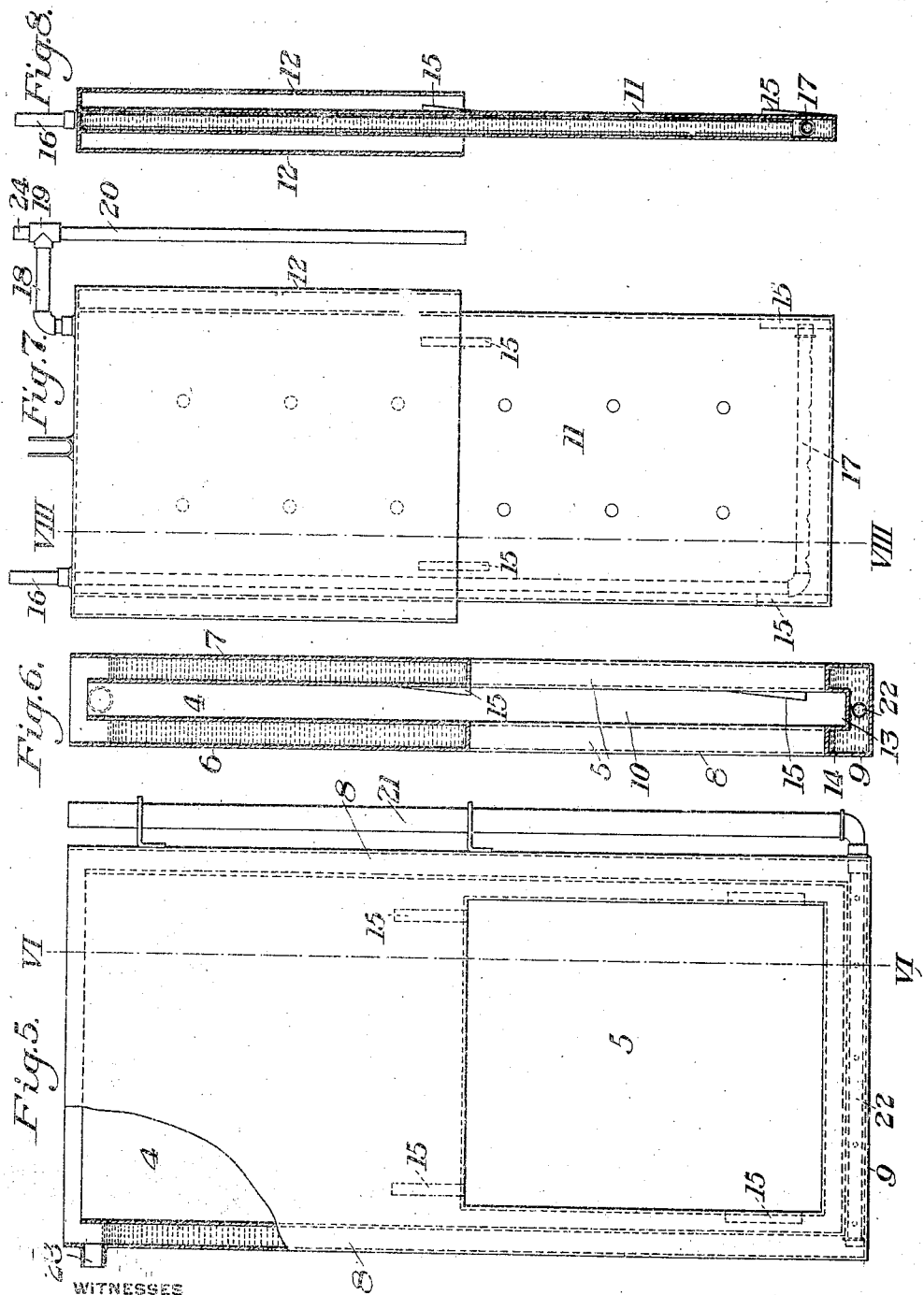

UNITED STATES PATENT OFFICE.

LUTHER L. KNOX, OF AVALON, PENNSYLVANIA, ASSIGNOR TO KNOX PRESSED & WELDED STEEL COMPANY, OF PITTSBURGH, PENNSYLVANIA, A CORPORATION OF PENNSYLVANIA.

WATER-COOLED VALVE OR DAMPER.

1,102,197.

Specification of Letters Patent. Patented June 30, 1914.

Application filed April 19, 1913. Serial No. 762,230.

*To all whom it may concern:*

Be it known that I, LUTHER L. KNOX, a citizen of the United States, residing at Avalon, in the county of Allegheny and State of Pennsylvania, have invented a new and useful Improvement in Water-Cooled Valves or Dampers, of which the following is a full, clear, and exact description, reference being had to the accompanying drawings, forming part of this specification, in which—

Figures 1 and 2 are vertical sections taken in planes at substantially right angles to each other of a valve or damper arrangement and construction embodying my invention; the plane of section of Fig. 2 is on the line II—II of Fig. 1; Fig. 3 is a section on the line III—III of Fig. 2 and on a somewhat larger scale; Fig. 4 is a detail sectional view of the lower portion of the damper and of the frame or seating member; Fig. 5 is a front elevation partly broken away of the frame or seating member; Fig. 6 is a section on the line VI—VI of Fig. 5; Fig. 7 is a front elevation of the damper proper; and Fig. 8 is a section on the line VIII—VIII of Fig. 7.

My invention has relation to water-cooled dampers or valves, particularly designed for use in furnace flues.

The object of my invention is to provide a water-cooled damper or valve of novel construction and arrangement in which the parts are thoroughly protected by the circulation of cooling water and which will provide a seal for the edges of the damper or valve.

My invention also provides a novel water circulation through the parts of the valve and its frame or seating member.

The nature of my invention will be best understood by reference to the accompanying drawings, forming part of this specification, in which I have shown the preferred embodiment thereof and which will now be described, it being premised, however, that various changes may be made in the details of construction and arrangement, without departing from the spirit and scope of my invention as defined in the appended claims.

In these drawings, the numeral 2 designates the wall of a furnace flue 3. The frame or seating member of the damper is of general rectangular form with a vertical opening 4 therein, which forms the guide for the damper proper. This frame is set in the flue wall 2 transversely thereof, its lower portion having the registering openings 5, intercepting the opening 4 and in alinement with the flue 3. The vertical opening 4 partially divides the frame into the parallel front and rear portions 6 and 7, these two portions being connected at the sides by the vertical legs 8 and at the bottom by the transverse portion 9. At the sides of the opening 5, the legs 8 are formed with the vertical grooves 10 which constitute edge guides for the damper. The entire frame is made hollow, the different interior portions thereof being in free communication with each other, and is designed to be entirely filled with the cooling liquid.

The numeral 11 designates the damper proper which consists of a hollow rectangular body portion adapted for vertical movement in the opening 4 of the frame and having at its upper portion at each side a hollow depending apron 12. The spaces inclosed by these aprons are open at the bottom and closed at the top; and when the parts are assembled, the aprons extend downwardly within the hollow side portions 6 and 7 of the frame, the latter being open at the top. The transverse portion 9 of the frame is preferably provided on its upper surface with a central groove 13 to seat the lower edge of the damper. For the purpose of forcing the damper into contact with the sealing walls 14 of the grooves 10, the damper and the frame are provided with the coöperating inclined or wedge projections 15. As the damper is moved downwardly into its seat, these inclines or wedge projections coöperate with each other to force the damper into the seating and sealing position shown in Fig. 3. The interior of the body of the damper is designed to be kept filled with the cooling liquid. Any suitable circulating arrangement may be provided for maintaining a proper circulation through the damper and through the seating member or frame. I preferably provide means whereby the cold liquid is introduced at the bottom of the damper, thence rises to the upper portion thereof, is thence carried back into the lower portion of the seating member or frame, and then rises to the upper part of the latter where it is discharged. To this end, I provide the vertical water supply pipe 16, which extends downwardly within the body of the damper adjacent one side thereof and to a point near its lower end and terminating in a horizontally extending perforated discharge arm 17. The water discharged from this arm 17 rises through the body of the damper and escapes by means of a pipe 18, connected by a T 19 with a vertical pipe 20, which telescopes within another vertical 21, extending downwardly into the lower portion of the seating member or frame, where it terminates in a perforated horizontal discharge arm 22. 23 designates an outlet pipe at the upper portion of the seating member or frame. The T 19 is also preferably provided with a normally open upwardly extending vent pipe 24, for the purpose of permitting the escape of any steam which may be formed in the damper.

25 designates suitable lifting lugs on the upper end of the damper by means of which it may be raised and lowered. In raising and lowering, the pipe 20 telescopes freely within the pipe 21, thus maintaining a constant water circulation in all positions of the damper.

My invention provides a construction by which a very considerable body of cooling water may be maintained within the damper and its seating member or frame. The parts of the damper and frame which are directly exposed to the action of the hot air or gases in the flue 3 are all protected by the direct action of this body of water. My invention also provides means whereby not only is there insured a closed or sealed joint between the damper and the seating surfaces of the frame, but the provision of the aprons 12, depending within the water chambers of the frame, effectively seals the flue against the escape of any gases between the upper portion of the damper and the frame. The parts can be readily and cheaply constructed from sheet metal shapes, preferably welded at the joints.

I claim:

1. A valve or damper seating and guiding member, comprising a casing formed with inner and outer walls, the inner walls surrounding a transverse vertical opening which extends downwardly within the casing from the upper end thereof to form an inclosing guideway for a valve or damper, the casing having a horizontal flue opening intersecting said vertical opening, and the space between the inner and outer walls of the casing being adapted to contain a cooling medium, said casing having openings at its upper end to receive seating members on the valve or damper; substantially as described.

2. A hollow valve-seating member having a flue opening therethrough, and a portion extending above the flue opening to a height substantially equal to the height of said opening, said member inclosing a vertical opening for a valve or damper, and the portion above the flue opening having an open-topped water chamber at both the front and the rear sides of said opening, substantially as described.

3. A valve or damper seating and guiding member, comprising a casing formed with inner and outer walls, the inner walls surrounding a transverse vertical opening which extends downwardly within the casing from the upper end thereof to form an inclosing guide-way for a valve or damper, the casing having a horizontal flue opening intersecting said vertical opening, the space between the inner and outer walls of the casing being adapted to contain a cooling medium, in combination with a hollow water-cooled valve or damper movable vertically in said guideway, and means for circulating a cooling medium in said valve or damper, the valve or damper having depending apron portions at its upper end which extend downwardly between the inner and outer walls of the casing; substantially as described.

4. A damper or valve arrangement comprising a hollow water-cooled seating member having a flue opening therethrough, a vertical opening extending downwardly therein and intersecting the flue opening, and a water-cooled valve or damper body mounted to move vertically in said vertical opening, together with means for circulating water through the valve body, and the latter having an overflow pipe which telescopes into a supply pipe leading into the frame member, substantially as described.

In testimony whereof, I have hereunto set my hand.

LUTHER L. KNOX.

Witnesses:
H. M. CORWIN,
GEO. H. PARMELEE.

Copies of this patent may be obtained for five cents each, by addressing the "Commissioner of Patents, Washington, D. C."